United States Patent [19]

Sawyer et al.

[11] 4,277,373

[45] Jul. 7, 1981

[54] ALUMINA-ALUMINUM FLUOROPHOSPHATE-CONTAINING CATALYSTS

[75] Inventors: Willard H. Sawyer, Baton Rouge; Neville L. Cull, Baker, both of La.

[73] Assignee: Exxon Research & Engineering Co., Florham Park, N.J.

[21] Appl. No.: 66,940

[22] Filed: Aug. 16, 1979

[51] Int. Cl.³ .................... B01J 27/14; B01J 29/06
[52] U.S. Cl. ........................ 252/437; 252/455 Z; 208/111
[58] Field of Search ................... 252/437, 455 Z

[56] References Cited

U.S. PATENT DOCUMENTS

| | | | |
|---|---|---|---|
| 3,342,750 | 9/1967 | Kearby | 208/114 |
| 3,544,452 | 12/1970 | Joffe | 208/216 |
| 3,558,476 | 1/1971 | Robbins et al. | 208/120 |
| 3,562,148 | 2/1971 | Mitsche | 208/139 |
| 3,904,550 | 9/1975 | Pine | 252/437 |
| 4,080,311 | 3/1978 | Kehl | 252/437 |
| 4,158,621 | 6/1979 | Swift et al. | 252/437 X |
| 4,179,358 | 12/1979 | Swift et al. | 252/437 X |

FOREIGN PATENT DOCUMENTS 47-43747 11/1972 Japan ..................... 252/437

*Primary Examiner*—Delbert E. Gantz
*Assistant Examiner*—William G. Wright
*Attorney, Agent, or Firm*—Marthe L. Gibbons

[57] ABSTRACT

A catalyst is provided which comprises an ultrastable Y-type crystalline aluminosilicate zeolite, an alumina-aluminum fluorophosphate and a hydrogenation component. Hydrocarbon hydroprocessing processes utilizing the catalyst are also provided.

8 Claims, 1 Drawing Figure

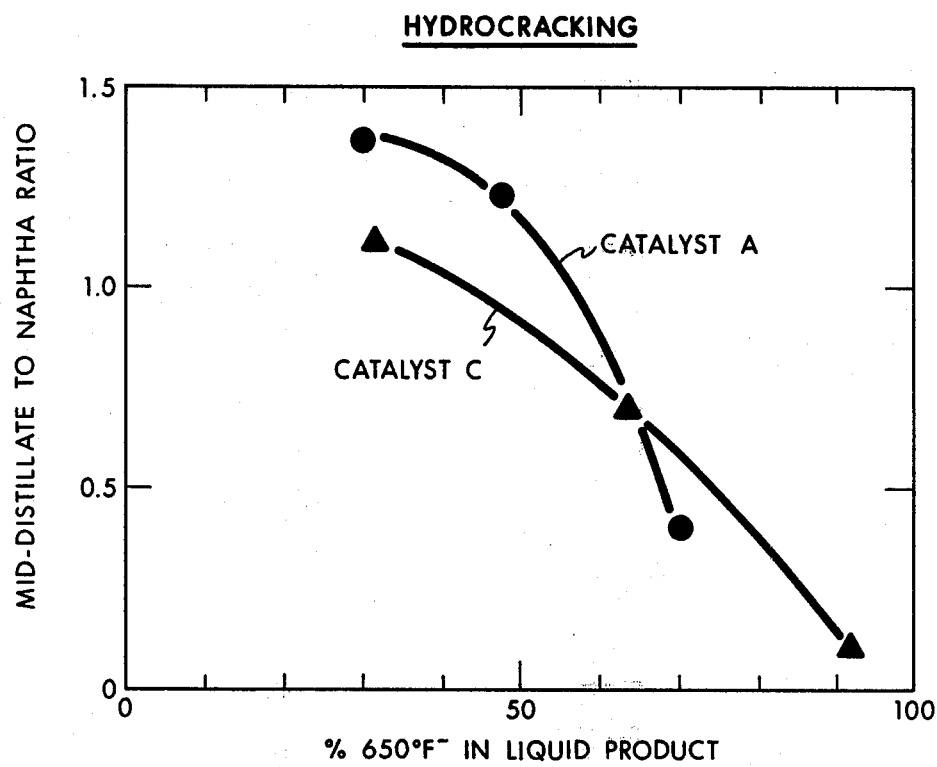

ALUMINA-ALUMINUM FLUOROPHOSPHATE-CONTAINING CATALYSTS

BACKGROUND OF THE INVENTION

1. Field of the Invention

This invention relates to a catalyst comprising an alumina-aluminum fluorophosphate and its use in hydrocarbon hydroprocessing processes.

2. Description of the Prior Art

Hydroprocessing utilizing catalyst in the presence of hydrogen to refine or convert hydrocarbons is well-known. The term "hydroprocessing" is used herein to denote a process in which a hydrocarbonaceous chargestock is contacted with a catalyst in the presence of hydrogen and under selected conditions to remove heteroatoms, such as sulphur, nitrogen, oxygen and metallic contaminants such as nickel, vanadium and iron from the chargestock and/or to saturate hydrocarbons and/or olefinic hydrocarbons in the feedstock and/or to hydrocrack the chargestock. Suitable hydroprocessing processes include hydroconversion, hydrocracking, hydrodesulfurization, hydrodenitrogenation, hydrodemetallization, etc.

A catalyst is known in which finely divided crystalline aluminosilicate particles are supported in an alumina-halogen matrix. The catalyst may be composited with hydrogenation components. See U.S. Pat. No. 3,562,418.

Encapsulated zeolite catalysts are also known. See, for example, U.S. Pat. No. 3,558,476.

A catalyst comprising fluorine and metal phosphate is also known. See U.S. Pat. No. 3,544,452.

SUMMARY OF THE INVENTION

In accordance with the invention there is provided a catalyst comprising a hydrogenation component selected from the group consisting of Group VIB metal components and Group VIII metal components and mixtures thereof of the Periodic Table of Elements, composited with an ultrastable Y-type crystalline aluminosilicate zeolite and an alumina-aluminum fluorophosphate.

Furthermore, in accordance with the invention, processes for hydroprocessing hydrocarbonaceous feeds utilizing the above catalysts are also provided.

BRIEF DESCRIPTION OF THE DRAWING

The FIGURE is a graph showing hydrocracking selectivity to conversion utilizing one of the catalysts of the present invention.

DETAILED DESCRIPTION OF THE INVENTION

The catalyst of the present invention comprises an ultrastable Y-type crystalline aluminosilicate zeolite, an alumina-aluminum fluorophosphate, a hydrogenation component, and optionally, an alumina gel matrix which may additionally comprise silica.

THE ULTRASTABLE Y-TYPE ZEOLITE

Ultrastable Y-type zeolites are well-known. They are described, for example, in U.S. Pat. Nos. 3,293,192 and 3,402,996 and in the publication *Society of Chemical Engineering (London) Monograph Molecular Sieves,* Page 186 (1968) by C. V. McDaniel and P. K. Maher, the teachings of which are hereby incorporated by reference. In general, "ultrastable" refers to a Y-type zeolite that is highly resistant to degradation of crystallinity by high temperature and steam treatment and is characterized by R$_2$O content (wherein R is Na, K or any other alkali metal ion) of less than about 1 weight percent and a unit cell size less than 24.5 Angstroms and a silica to alumina mole ratio in the range of 3.5 to 7 or higher. The particle size of the zeolites are usually in the range of 0.1 to 10 microns, more preferably in the range of 0.5 to 3 microns. Preferably, the ultrastable Y-type zeolite component of the catalyst will be substantially free of rare earth metals. By "substantially rare earth free" is meant herein that the rare earth metal content of the zeolite will be less than about 1 weight percent, calculated as the elemental metal, based on the zeolite.

THE ALUMINA-ALUMINUM FLUOROPHOSPHATE COMPONENT

The alumina-aluminum fluorophosphate component will generally comprise from about 75 to about 94 weight percent alumina and from about 6 to about 25 weight percent fluorophosphate. The alumina-aluminum fluorophosphate may suitably be present in the catalyst in amounts ranging from about 10 to about 50 weight percent, preferably from about 20 to about 30 weight percent, based on the total catalyst.

ALUMINA-CONTAINING GEL COMPONENT

Optionally, the ultrastable Y-type zeolite and the alumina-aluminum fluorophosphate may be dispersed in an alumina-containing gel. Any alumina gel generally used as matrix in hydroprocessing catalysts is suitable for use in the present invention, such as gamma alumina, eta alumina, theta alumina. The alumina gel matrix may additionally comprise silica. The amount of silica in the alumina-containing gel matrix will depend upon the end usage of the catalyst. Thus, for hydrodesulfurization catalysts, an alumina-containing matrix comprising from about 1 to about 6 weight percent silica, based on the alumina matrix component, would be suitable. When the catalyst is to be used as a hydrocracking catalyst, then from about 1 to about 10 weight percent silica, based on the alumina-containing matrix is suitable.

THE HYDROGENATION COMPONENT

Suitable hydrogenation components include elemental metal, metal oxide or metal sulfide of Group VIB metal and of Group VIII metal and mixtures thereof. The Periodic Table referred to herein is in accordance with the *Handbook of Chemistry and Physics* by Chemical Rubber Company, Cleveland, Ohio, 45th Edition, 1964. The preferred Group VIB metal component in the final catalyst is selected from the group consisting of molybdenum oxide, molybdenum sulfide, tungsten oxide, tungsten sulfide and mixtures thereof. The preferred Group VIII metal component in the final catalyst is selected from the group consisting of nickel oxide, nickel sulfide, cobalt sulfide, cobalt oxide and mixtures thereof. A preferred catalyst for hydrocracking may comprise, for example, from 10 to about 50 weight percent, preferably about 25 weight percent of said ultrastable Y-type zeolite, from about 10 to about 50 weight percent, preferably about 25 weight percent alumina-aluminum fluorophosphate encapsulated in alumina gel or in silica-alumina gel and containing from about 1 to about 5 weight percent, preferably from about 2 to about 4 weight percent, (calculated as the oxide) of a Group VIII metal component, such as nickel oxide, and from about 5 to about 25 weight percent, preferably from about 12 to about 18 weight percent (calculated as the oxide), of a Group VIB metal component, preferably molybdenum oxide.

Example of a preferred catalyst in accordance with the invention for use as hydrodesulfurization catalyst comprises from about 10 to about 50 weight percent, preferably about 25 weight percent of said ultrastable Y-type zeolite, from about 10 to about 50 weight percent, preferably about 25 weight percent of said alumina-aluminum fluorophosphate encapsulated in an alumina gel, and a Group VIII metal component, preferably a mixture of Group VIII metal components such as from about 1 to about 5 weight percent cobalt oxide, preferably from about 2.5 to about 4.5 weight percent cobalt oxide, calculated as the oxide; from about 1 to about 5 weight percent, preferably from about 2.5 to about 4.5 weight percent nickel component, calculated as the nickel oxide, and a Group VIB metal component, preferably from about 5 to about 25 weight percent, more preferably from about 12 to about 18 weight percent molybdenum component, calculated as the molybdenum oxide.

The catalyst of the present invention may be prepared by any method known in the art. One method of preparing the catalyst of the present invention is to add an ultrastable Y-type crystalline aluminosilicate zeolite and an alumina-aluminum fluorophosphate to an alumina-containing hydrogel, which may additionally comprise silica. The resulting product is dried in air and calcined at a temperature ranging from about 500° to about 600° C. The calcined product is impregnated with hydrogenation components by methods well-known in the art, such as by utilizing a salt of the desired hydrogenation component. It should be noted that the hydrogenation component may be composited with the catalyst of the present invention in any manner known in the art and at any suitable stage of the preparation of the catalyst. The resulting product is calcined at a temperature ranging from about 350° to about 500° C.

The catalyst of the present invention may be formed in any desired shape such as spheres, pellet, pills, cake, extrudates, powders, granules, etc. However, the particularly preferred form of the catalyst is the sphere. Spheres may be manufactured by methods well-known in the art.

The final catalyst of the present invention may comprise from about 10 to about 50 weight percent, preferably about 25 weight percent of said ultrastable Y-type zeolite, from about 10 to about 50 weight percent, preferably about 25 weight percent of said alumina-aluminum fluorophosphate. Optionally, the catalyst may comprise an alumina gel-containing matrix wherein said alumina comprises from about 0.1 to about 60 weight percent, based on the total catalyst. The hydrogenation component may be present in the catalyst in amounts ranging from about 5 to about 40 weight percent, calculated as the oxide, based on the total catalyst. The final catalyst may additionally comprise from about 1 to about 5 weight percent silica, based on the total catalyst. When the catalyst is used for hydrodesulfurization, it is preferred to use from about 1 to about 5 weight percent silica, based on the weight of the total catalyst. When the catalyst is intended for hydrocracking, it is preferred to use from about 1 to about 10 weight percent silica, based on the total catalyst.

The catalyst of the present invention may be sulfided prior to use in a conventional manner. The catalyst may be disposed in a fixed bed, moving bed, fluidized bed, ebullating bed, disperse phase, etc.

The catalyst of the present invention may be used in hydrorefining, hydrodesulfurization, hydrocracking, hydrogenation, etc.

The operating conditions to be employed in the practice of the present invention are well-known and vary with the particular conversion reaction desired. Table I summarizes typical reaction conditions effective in the present invention.

TABLE I

| Principal Reaction Desired | Temp., °F. | Pressure, psig | Feed Rate V/V/Hr. |
|---|---|---|---|
| Hydrorefining | 500–800 | 50–2000 | 0.1–10 |
| Hydrodesulfurization | 600–850 | 500–3500 | 0.05–5 |
| Hydrocracking | 400–950 | 200–3000 | 0.1–10 |

The catalyst of the present invention is particularly suited for hydrodesulfurization and hydrocracking.

Preferred and more preferred hydrodesulfurization conditions utilizing a catalyst of the present invention are a preferred temperature from 600° to 800° F., more preferably from 675° to 750° F., a preferred pressure of 200 to 2000 psig, more preferably 1300 to 1700 psig; a preferred feed rate of 0.5 to 5 V/Hr/V, more preferably 0.7 to 2 V/Hr/V; a hydrogen rate of 200 to 3000 SCF/B, preferably and more preferably 1300 to 1700 SCF/B.

Preferred and more preferred hydrocracking conditions utilizing the catalyst of the present invention are a preferred temperature ranging from about 600° to about 900° F., more preferably from about 700° to about 800° F.; a preferred pressure ranging from about 1500 to 2500 psig, more preferably from about 1000 to 1500 psig; a hydrogen rate at 1000 to 10,000 SCF/B, preferably 4000 to 6000 SCF/B. A most preferred hydrocracking process operates at a start-of-run temperature of about 700° to 725° F. wherein the once-through conversion is 25 to 60 weight percent, preferably 40 to 50 weight percent 650° F.− and recycling to extinction of the 650° F.+ material.

The feedstocks suitable for conversion in accordance with the invention include any of the well-known feeds generally employed in hydrocarbon hydroprocessing processes. The hydrocarbonaceous oil feed may be derived from any source, such as petroleum, shale, tar sands, coal liquefaction products, including coal liquefaction bottoms, and mixtures thereof. For hydrocracking and hydrodesulfurization with a catalyst of the present invention, oils having an atmospheric pressure boiling point ranging from about 450° to about 1050° F., preferably from about 650° to 1050° F. are preferred, for example, gas oils. More preferably, for hydrocracking, the nitrogen content of the hydrocarbonaceous feed to the hydrocracking stage is less than about 10 wppm. The low nitrogen content can be obtained by prehydrotreating a hydrocarbonaceous feed having a higher nitrogen content, as is well-known in the art, utilizing a conventional, suitable catalyst such as, for example, nickel-molybdenum on alumina.

PREFERRED EMBODIMENTS

The following examples are presented to illustrate the invention.

EXAMPLE 1

Forty grams of ultrastable Y-type crystalline aluminosilicate were suspended in a solution of 512 grams of 95% aluminum sec-butoxide (ca. 2 mols) plus 18.7 grams of tetraethyl silicate (ca. 0.09 mols) with 1000 cc. of sec-butyl alcohol as diluent. To the stirred suspension was added over ca. 3.5 hrs. at the rate of 5–6 cc/minutes, a hydrolyzing solution comprising 20 cc of fluorophosphoric acid, 97 cc $H_2O$ and ca. 880 cc. of sec-butyl alcohol. After all of the hydrolysis solution had been added, the temperature was raised to ca. 65° C. and the mixture stirred for one hour.

The product was filtered, air dried, and dried in an oven at 110°–120° C. overnight. The dried product was pilled and calcined for 16 hours at 538° C. in air. The calcined pills were crushed and screened to give a 14/35 mesh Tyler fraction.

Fifty cc (20.00 g) of the 14/35 mesh Tyler support material were allowed to set out in the air overnight yielding 23.8 grams of air-exposed material. This was impregnated with 5.1 g of phosphomolybdic acid and 3.9 g of $Ni(NO_3)_2.6H_2O$ using methanol as the solvent (80 cc) and allowed to stand under the methanol solution overnight. The methanol was evaporated and the catalyst simmered with a $C_6$ alcohol for 1 hour at 260° F. After oven drying, the sample was calcined 1 hour at 600° F. ($N_2$) and 2 hours at 800° F. (air).

The resulting calcined catalyst, herein designated, Catalyst A, is a catalyst in accordance with the present invention. Catalyst A had the following composition:

| CATALYST A | |
|---|---|
| Component | Wt. % (Calc.) |
| Ultrastable Y Zeolite | 19.4 |
| Alumina-Aluminum Fluorophosphate | 58.0 |
| $SiO_2$ | 2.6 |
| NiO | 5.1 |
| $MoO_3$ | 14.9 |

Note that analysis of the support prior to metals impregnation showed 5.5 wt. % P and 3.95 wt. % F.

EXAMPLE 2

Catalyst A was compared to a standard catalyst herein designated as Catalyst C. The catalysts were tested in a four reactor catalyst screening unit having a common sand bath. In each reactor, 10 cc of Catalyst B were added to the top of the reactor to reduce the nitrogen content to less than 10 wppm before contacting the feed with the hydrocracking catalyst. In one reactor, 10 cc of Catalyst C were added to the bottom, and in the other reactor, 10 cc of Catalyst A, which is a catalyst in accordance with the present invention, were used. The test utilizing Catalyst C was designated "run 160" while the test utilizing Catalyst A was designated "run 163".

The catalysts were charged as 14–35 mesh Tyler and the test was carried out downflow. The compositions of the catalysts are shown in Table II.

TABLE II

| Catalyst B | | Catalyst C | |
|---|---|---|---|
| Component | Wt. % | Component | Wt. % |
| $Al_2O_3$ | 68.96 | $Al_2O_3$ | 50 |
| $SiO_2$ | 6.00 | Y Zeolite | 20 |
| NiO | 3.12* | NiO | 6 |
| $MoO_3$ | 15.92* | $MoO_3$ | 18 |
| $P_2O_5$ | 6.00 | $P_2O_5$ | 6 |

*by analysis

Sulfiding of the catalyst was started at 200° F. with 10% $H_2S$ in $H_2$ at atmospheric pressure. After 1 hour at these conditions, the temperature was increased to 450° F. for 1 hour and finally to 700° F., where it was held for ca. 16 hours. The sulfiding gas was cut out and temperature was raised to 720° F. and $H_2$ was cut in. Pressure was increased to 1300 psig and light Arab vacuum gas oil was cut in at 1 V/Hr/V (10 cc/hr) with respect to the hydrocracking catalyst. The gas rate was adjusted to 6000 SCF/B (10.7 1/hr).

The feedstock used was a vacuum gas oil having an atmospheric pressure boiling range from about 650° to 1050° F.

Operation at these conditions was maintained until steady state data were obtained, at which time the temperature was increased to 746° F. In addition, data were obtained at 769° F. with a check of activity back at 720° F. Results of the test are shown in Table III.

TABLE III

| | Catalyst C | | | | Catalyst A | | | | |
|---|---|---|---|---|---|---|---|---|---|
| Temp, °F. | 720 | 744 | 769 | 720 | 720 | 744 | 769 | 720 | Feed |
| API at 60° F. | 32.3 | 41.7 | 46.7 | 28.0 | 33.7 | 37.6 | 41.7 | 27.6 | 20.9 API |
| S, ppm | 35 | 17 | 21 | 159 | 41 | 13 | 13 | 217 | 2.35% |
| N, ppm | 6 | 2 | — | — | 5 | 2 | — | — | 892 ppm |
| % 650° F.⁻ | 36.6 | 64.2 | 92.1 | — | 30.0 | 46.3 | 71.2 | — | 1.4% 650° F.⁻ |
| MD/NAP[1] | 1.13 | 0.70 | 0.11 | — | 1.39 | 1.21 | 0.42 | — | — |

[1]430–650/$C_5$-430° F. (middle distillate to naphtha)

The selectivity to conversion relationship is shown in the FIGURE.

Catalyst A, which is a catalyst in accordance with the present invention, showed better selectivity to mid-distillates at conversion levels below 60 weight percent compared to Catalyst C at the same conversion level. In addition, at low temperatures (e.g., 720° F.), activity was similar to that attained by Catalyst C. Catalyst A is particularly well-suited for recycle operation where conversion per pass is limited to less than 50 weight percent 650° F.⁻ to take advantage of the good selectivity of the catalyst to mid-distillate.

EXAMPLE 3

Eighty grams of ultrastable Y-type crystalline aluminosilicate zeolite were suspended in a solution of 512 g of 95% aluminum sec-butoxide and 1000 cc of sec-butyl alcohol diluent. The mixture was hydrolyzed using 20 cc of fluorophosphoric acid, 97 cc of water and diluted to 1000 cc with sec-butyl alcohol. The hydrolysis mixture was added at room temperature at the rate of 5–6 cc/minute to the well-stirred aluminum butoxide zeolite mixture. After all the hydrolysis solution had been added, the temperature was raised to 60°–65° C. and held with stirring for 1 hour. The product was filtered, air dried, dried in an oven at 110°–120° C. overnight, then calcined 16 hours at 538° C. The calcined product had a BET surface area of 408 m²/g, a BET pore volume of 1.01 cc/g and a pore volume by MERPOR of 1.68 cc/g; 65% of pore volume in pores greater than 1000 Angstroms in diameter.

Thirteen and one-half grams of the above calcined product were mixed into a silica (2%) alumina hydrogel. The alumina-aluminum fluorophosphate was added in three steps, adjusting the pH between additions with ammonia. The pH is controlled to prevent premature coagulation of the hydrogel which would prevent formation of spheres. A pH of 6 to 7 was maintained. The silica-alumina hydrogel and the alumina-aluminum fluorophosphate-ultrastable Y-type zeolite mixture were then formed into spheres by methods known in the art. After air drying, the beads were calcined in air for 4 hours at 540° C.

The above calcined support was impregnated with phosphomolybdic acid and cobalt and nickel nitrates from methanol solutions, air dried and calcined 1 hour at 315° C., 1 hour at 427° C. under nitrogen, then 3 hours at 427° C. in air. Weight percent CoO=2.32%; wt. % NiO=2.58%; wt. % MoO$_3$=17.25%. The catalyst had a BET surface area of 278 m²/g and a pore volume of 0.92 cc/g (BET).

The resulting catalyst, herein designated "Catalyst D", is a catalyst in accordance with the present invention. Catalyst D had the following composition:

| CATALYST D | |
|---|---|
| Component | Wt. % (Calc.) |
| Ultrastable Y Zeolite | 8.50 |
| Alumina-Aluminum Fluorophosphate | 12.75 |
| SiO$_2$ | 1.10 |
| Al$_2$O$_3$ | 55.5 |
| CoO | 2.32* |
| NiO | 2.58* |
| MoO$_3$ | 17.25* |

*by analysis

EXAMPLE 4

Four catalysts were charged to a pilot unit. One catalyst was a standard catalyst, herein designated Catalyst E, having the following composition:

| CATALYST E | |
|---|---|
| Component | Wt. % |
| Al$_2$O$_3$ | 76.5 |
| CoO | 4.3 |
| MoO$_3$ | 19.2 | and another was Catalyst D of the present invention.

The evaluation of catalyst E was designated "run 164". The evaluation of catalyst D was designated "run 167". Twenty cubic centimeters of each catalyst were charged to an upflow reactor. The reactors were charged at 200° F. and 10% H$_2$S was cut in at atmospheric pressure and passed over the catalyst for 1 hour. The common sand bath was heated to 450° F. and sulfiding continued for another hour. Subsequently, the reactors were heated to 700° F. and sulfiding continued for about 16 hours.

The sulfiding gas was cut out and the temperature reduced to 575° F. H$_2$ was introduced at 5.3 l/hr (1500 SCF/B) and pressure raised to 1500 psig.

Next, a vacuum gas oil having an atmospheric pressure boiling point ranging from about 650° to 1050° F. and a sulfur content of about 2.4 weight percent was cut in at 20 cc/hr (1 V/Hr/V). The temperature was raised to 685° F. over a 1 to 2 hour period. The test was continued for 5 days. The results of these tests are summarized in Table IV.

TABLE IV

| Catalyst | E | D |
|---|---|---|
| Metals | Co/Mo | Ni-Co/Mo |
| Support | Al$_2$O$_3$ | AlFPO$_3$/Al$_2$O$_3$/USY |
| BET Surface Area, m²/gm | 181 | 278 |
| BET Pore Volume, cc/gm | 0.46 | 0.92 |
| Relative VGO HDS Activity | 100 | 119 |

Results of these tests show that Catalyst D, which is a catalyst of the present invention, is superior for the hydrodesulfurization of vacuum gas oils.

The term "BET" is used herein to designate the nitrogen adsorption method of Brunauer, Emmett and Teller as shown in J. Am. Soc., Vol. 60, (1938), pp. 309–319.

The term "MERPOR" is used herein to designate a mercury penetration method using porosimeter model 915-2 manufactured by Micrometritics Corp., Norcross, Georgia. The surface tension of the mercury was taken at a contact angle of 140°. A maximum pressure, of 50,000 psig was used unless otherwise specified.

What is claimed is:

1. A catalyst comprising a hydrogenation component selected from the group consisting of Group VIB metal component, Group VIII metal component and mixtures thereof of the Periodic Table of Elements, composited with an ultrastable Y-type crystalline aluminosilicate zeolite having a unit cell size less than 24.5 angstroms, and an alumina-aluminum fluorophosphate, said ultrastable Y-type crystalline aluminosilicate being substantially free of rare earth metals.

2. The catalyst of claim 1 wherein said catalyst additionally comprises an alumina-containing gel matrix and wherein said ultrastable Y-type zeolite and said alumina-aluminum fluorophosphate are dispersed in said alumina gel matrix.

3. The catalyst of claim 2 wherein said alumina gel matrix additionally comprises silica.

4. The catalyst of claim 1 wherein said hydrogenation component is selected from the group consisting of elemental metal, metal oxide and metal sulfide of Group VIB metals, elemental metal, metal oxide and metal sulfide of Group VIII metals and mixtures thereof.

5. The catalyst of claim 1 wherein said catalyst comprises from about 10 to about 50 weight percent of said ultrastable Y-type zeolite, from about 10 to about 50 weight percent of said alumina-aluminum fluorophosphate, from about 5 to about 40 weight percent of said hydrogenation component, calculated as the oxide, based on the total catalyst.

6. The catalyst of claim 5 wherein said catalyst additionally comprises from about 0.1 to about 60 weight percent of an alumina-containing gel.

7. The catalyst of claim 6 wherein said alumina-containing gel comprises from about 1 to about 10 weight percent silica based on the total catalyst.

8. The catalyst of claim 1 wherein said hydrogenation component comprises from about 1 to about 5 weight percent nickel component, calculated as the oxide, based on the total catalyst, and from about 5 to about 25 weight percent molybdenum component, calculated as the oxide, based on the total catalyst.

* * * * *